US011999037B2

(12) United States Patent
Schulz

(10) Patent No.: US 11,999,037 B2
(45) Date of Patent: Jun. 4, 2024

(54) SLIDE HAMMER WEIGHTS

(71) Applicant: Snap-on Incorporated, Kenosha, WI (US)

(72) Inventor: Benjamin T. Schulz, Racine, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 17/886,880

(22) Filed: Aug. 12, 2022

(65) Prior Publication Data

US 2023/0084385 A1 Mar. 16, 2023

Related U.S. Application Data

(63) Continuation of application No. 17/475,739, filed on Sep. 15, 2021, now Pat. No. 11,504,838.

(51) Int. Cl.
*B25D 1/16* (2006.01)

(52) U.S. Cl.
CPC .......... *B25D 1/16* (2013.01); *B25D 2250/015* (2013.01); *B25D 2250/105* (2013.01); *B25D 2250/241* (2013.01); *B25D 2250/391* (2013.01)

(58) Field of Classification Search
CPC ................ B25D 1/16; B25D 2250/015; B25D 2250/241; B25D 2250/391; B25D 2250/105
See application file for complete search history.

(56) References Cited

U.S. PATENT DOCUMENTS 3,519,087 A 7/1970 Santi
3,568,657 A 3/1971 Gue
4,327,787 A 5/1982 Loratto
4,876,928 A 10/1989 Gaulin
4,957,095 A 9/1990 Cameron
5,109,739 A 5/1992 Hull
5,243,749 A 9/1993 Shultz
6,769,182 B1 8/2004 McCabe
6,935,436 B1 8/2005 Williston
7,191,685 B2 3/2007 Lowther
8,486,084 B2 7/2013 Huene
8,695,458 B2 4/2014 Jensen et al.
9,198,337 B2 12/2015 Walsh et al.
10,611,010 B1 4/2020 Anderson
10,882,174 B2 1/2021 Chartier
2004/0035496 A1 2/2004 Ritzmann
2006/0102250 A1 5/2006 Ritzmann, II
(Continued)

FOREIGN PATENT DOCUMENTS

CN 101652227 A 2/2010
CN 102802398 A 11/2012
(Continued)

OTHER PUBLICATIONS

Combined Search and Examination Report for corresponding United Kingdom Application No. GB2213151.0 dated Mar. 3, 2023, 7 pages.

(Continued)

*Primary Examiner* — Jason L Vaughan
(74) *Attorney, Agent, or Firm* — Seyfarth Shaw LLP

(57) ABSTRACT

A slide hammer tool including a shaft having first and second opposing ends, a handle slidably coupled to the shaft, and a slide hammer weight assembly removable coupled to the handle via threaded fasteners. The slide hammer weight assembly including a number of slide hammer weights coupled together.

16 Claims, 2 Drawing Sheets

(56) References Cited

U.S. PATENT DOCUMENTS

| | | | |
|---|---|---|---|
| 2007/0179030 | A1 | 8/2007 | Slawinski |
| 2008/0257113 | A1 | 10/2008 | Neumarkel |
| 2014/0259695 | A1 | 9/2014 | Guynn |
| 2015/0183104 | A1 | 7/2015 | Patterson |
| 2018/0311802 | A1 | 11/2018 | Kemppainen |
| 2020/0171641 | A1 | 6/2020 | Bendorf |

FOREIGN PATENT DOCUMENTS

| | | | |
|---|---|---|---|
| CN | 211681907 | U | 10/2020 |
| CN | 112809622 | A | 5/2021 |
| DE | 20313426 | U | 11/2003 |

OTHER PUBLICATIONS

Chinese Office Action for corresponding Application No. 11220535130 dated Jun. 5, 2023, 8 pages.
Examination Report No. 1 for corresponding Application No. 2022218471 dated Oct. 13, 2023, 5 pages.
Canadian Office Action for corresponding Application No. 3,171,149 dated Nov. 8, 2023, 4 pages.

SLIDE HAMMER WEIGHTS

CROSS REFERENCES TO RELATED APPLICATIONS

This application is a continuation of and claims the benefit of U.S. patent application Ser. No. 17/475,739, filed Sep. 15, 2021, the contents of which are incorporated herein by reference in their entirety.

TECHNICAL FIELD OF THE INVENTION

The present invention relates generally to slide hammers. More specifically, the present invention relates to weights for a slide hammer.

BACKGROUND OF THE INVENTION

A slide hammer is a tool that engages an object needing to be pulled and transmits an outwardly, pulling force to the object without striking the object. Slide hammers typically consist of a long metal shaft with an attachment point at one end, a hammer weight slidably coupled to the shaft, and a stop for the weight to impact on the end opposite the attachment point. The inertia of the weight is thereby transferred to the object by a puller coupled to the attached end via the shaft, thereby pulling the object in the direction the weight impacts the stop. The puller is coupled to attachment end by screw threads or other well-known methods. Slide hammers are typically used in automotive repair to pull dents or remove bushings, seals, sleeves, bearings, pressed-in bolts, etc.

Conventional slide hammers are limited to specific applications and have a specific mass and size. This requires users to purchase and carry multiple slide hammers if an application is needed that is not suitable for a single slide hammer.

SUMMARY OF THE INVENTION

The present invention relates broadly to slide hammer weights that are removably coupled to each other and a slide hammer via fasteners. The present invention allows the number and amount of weights used by a slide hammer to be selectively adapted and varied. This allows the user to have one "set" of slide hammer weights that can be used in different configurations, instead of requiring multiple different slide hammers for different applications to be purchased and maintained. The present invention also allows for identical slide hammer weights to be used, thereby reducing manufacturing cost by reducing the amount of different types of slide hammer weights needing to be manufactured and stored.

In an embodiment, the present invention broadly comprises a slide hammer tool having a shaft with opposing first and second ends, a handle slidably coupled to the shaft, and a slide hammer weight assembly removably coupled to the handle.

In another embodiment, the present invention broadly comprises a slide hammer weight assembly adapted to be releasably coupled to a handle of a slide hammer tool. The slide hammer weight assembly comprising slide hammer weights releasably coupled together via threaded fasteners.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
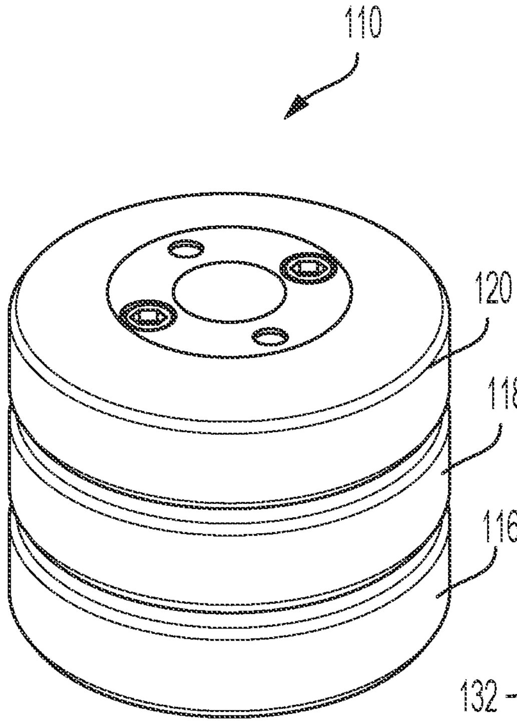
FIG. 1 is a perspective, assembled view of an exemplary slide hammer weight assembly, according to an embodiment of the present invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention, but is instead used to discuss exemplary embodiments of the invention for explanatory purposes only.

The present invention relates broadly to one or more slide hammer weights that are removably coupled to each other via fasteners, thereby cooperatively defining a hammer weight, wherein the hammer weight is then coupled to a slide hammer. The present invention allows for the number and size of weights used by a slide hammer to be varied. This allows the user to have one "set" of slide hammer weights that can be used in different configurations, instead of requiring multiple different types and sizes of slide hammers for different applications to be purchased, stored and maintained. The present invention also allows for identical slide hammer weights to be used, thereby reducing manufacturing cost by reducing the amount of different types of slide hammer weights needing to be manufactured and stored.

Figure 2:
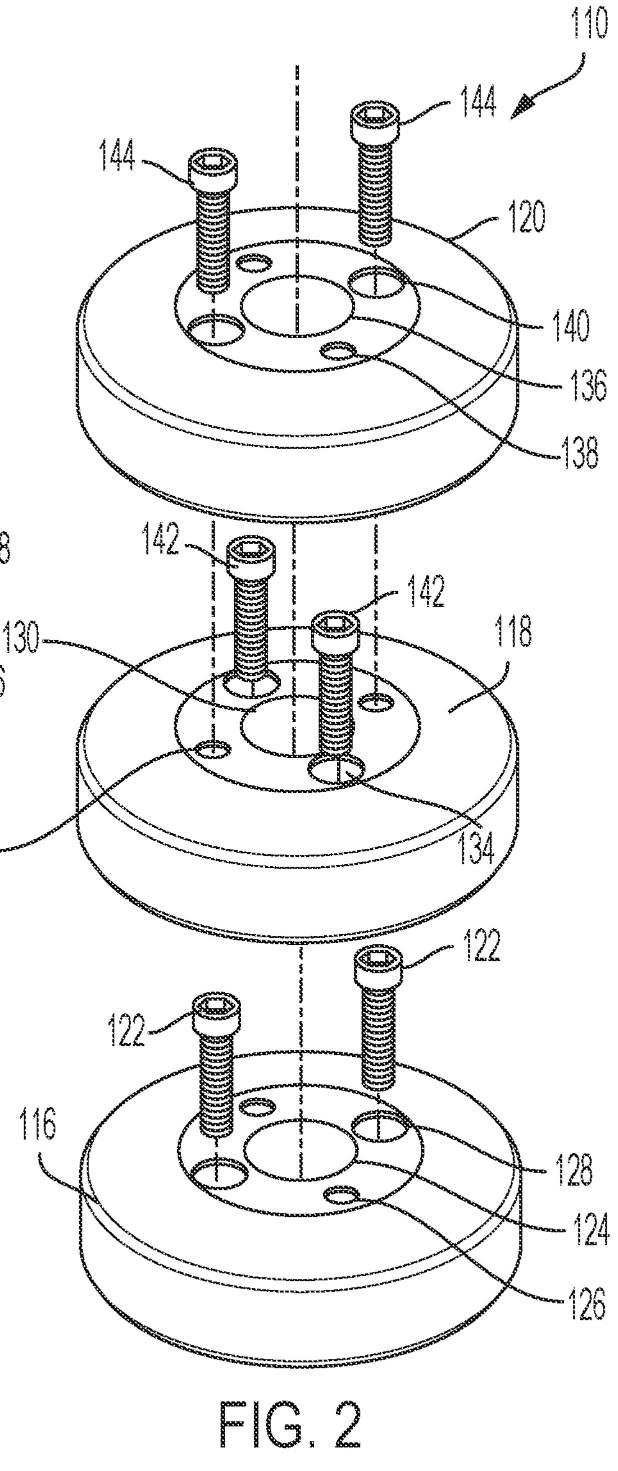
FIG. 2 is a perspective, disassembled view of the slide hammer weight assembly of FIG. 1.
Figure 3:
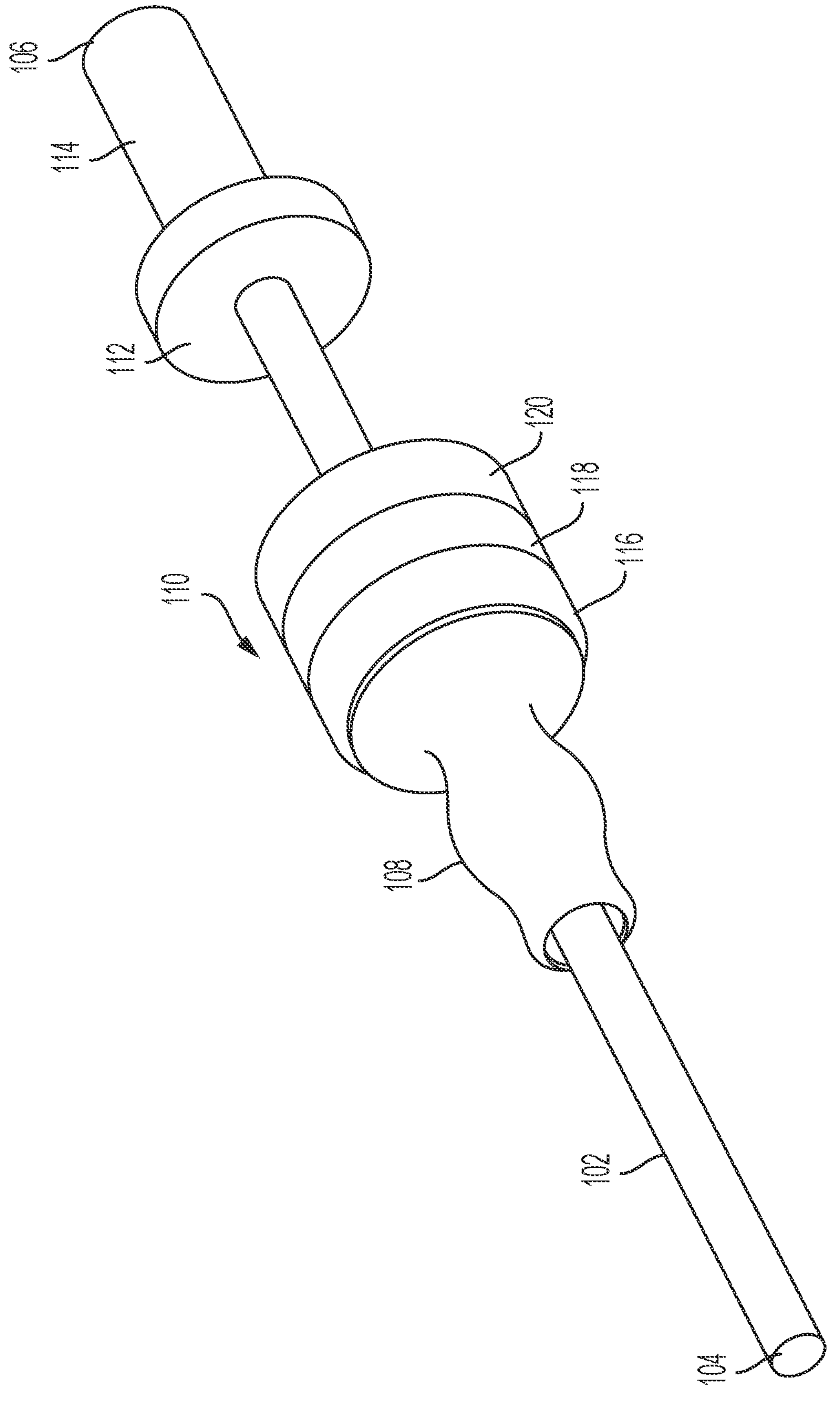
FIG. 3 is a perspective view of the slide hammer weight assembly of FIG. 1 coupled to an exemplary slide hammer, according to an embodiment of the present invention.

Referring to FIGS. 1-3, an exemplar slid hammer tool 100 includes a shaft 102 having opposing first 104 and second 106 ends, a handle 108 slidably coupled to the shaft 102, and a slide hammer weight assembly 110 removable coupled to the handle 108. The first end 104 is adapted to couple to an attachment, such as, for example, a conventional puller (not shown) in a well-known manner, such as, for example, threadably coupled via threads formed on the first end 104. The puller can be one or more of jaws, adaptors, hooks, body dent pullers, stud-pulling heads, etc. that is adapted to engage an object, such as, for example, bushings, seals, sleeves, bearings, bearing races, bushings, pressed-in studs, etc. for removal in a well-known manner.

The second end 106 includes a stop 112 adapted to receive the impacting force from the hammer weight assembly 110 as a user slides the handle 108 along the shaft 102 during use. The shaft 102 transfers the potential energy in the weights and the inertia from the impact force to the object via the puller in a well-known manner. In an embodiment, the second end 106 further includes a grip 114 that allows a user to use a second hand to operate the slide hammer 100.

In an embodiment, the slide hammer weight assembly 110 may include first 116, second 118, and third 120 slide hammer weights. It will be appreciated that any number of slide hammer weights can be used. In the illustrated embodiment, the first 116, second 118, and third 120 slide hammer weights substantially identical. In another embodiment, the slide hammer weight assembly 110 includes slide hammer weights having different weight amounts. In an embodiment the slide hammer weights are in a range of about 1 to 5 pounds (0.45 to 2.27 kilograms). As described in more detail below the first 116 and second 118 slide hammer weights are releasably coupled together, the second 118 and third 120 slide hammer weights are releasably coupled together, and the first slide hammer weight 116 is releasably coupled to the handle 108 via a first set of threaded fasteners 122, such as, for example, a bolt or screw. Although three slide hammer weights are illustrated, the invention is not limited as such and any suitable number of slide hammer weights may be used.

The first slide hammer weight 116 includes a first slide hammer weight center aperture 124 adapted to slidably receive the shaft 102, first slide hammer weight threaded apertures 126, and first slide hammer weight fastener clearance apertures 128 adapted to receive the first set of threaded fasteners 122. The first set of threaded fasteners 122 releasably couple the first slide hammer weight 116 to the handle 108 by passing through the first slide hammer weight fastener clearance apertures 128 and threadably engaging threaded apertures in the handle 108.

The second slide hammer weight 118 includes a second slide hammer weight center aperture 130 adapted to slidably receive the shaft 102, second slide hammer weight threaded apertures 132, and second slide hammer weight fastener clearance apertures 134 adapted to receive the second set of threaded fasteners 142. The second set of threaded fasteners 142 thus releasably couple the first slide hammer weight 116 to the second slide hammer weight 118 by passing through the second slide hammer weight fastener clearance apertures 134 and threadably engaging the first slide hammer weight threaded apertures 126.

The third slide hammer weight 120 includes a third slide hammer weight center aperture 136 adapted to slidably receive the shaft 102, third slide hammer weight threaded apertures 138, and third slide hammer weight fastener clearance apertures 140 adapted to receive the third set of threaded fasteners 144. The third set of threaded fasteners 144 thus releasably couple the second slide hammer weight 118 to the third slide hammer weight 120 by passing through the third slide hammer weight fastener clearance apertures 140 and threadably engaging the second slide hammer weight threaded apertures 132.

Accordingly, the first 122, second 142, and third 144 sets of threaded fasteners releasably couple the slide hammer weight 116, 118, 120 together and axially align the first 124, second 130, and third 136 slide hammer weight center apertures to allow the shaft 102 to be slidably received therein. Although two threaded fasteners are illustrated for each of the first 122, second 142, and third 144 sets of threaded fasteners, the invention is not limited as such and any suitable number of fasteners may be used.

In an embodiment, the first 128, second 134, and third 140 slide hammer weight clearance apertures are counterbores. In another embodiment, the first 124, second 130, and third 136 slide hammer weight center apertures have a corresponding cross-section as a cross-section of the shaft 102, such as, for example, circular, square, etc. Although the slide hammer weights 116, 118, 120 are illustrated to respectively include two of first 128, second 134, and third 140 slide hammer weight clearance apertures and two of first 126, second 132, and third 138 threaded apertures, the invention is not limited as such and any number of suitable apertures may be used.

As used herein, the term "coupled" can mean any physical, electrical, magnetic, or other connection, either direct or indirect, between two parties. The term "coupled" is not limited to a fixed direct coupling between two entities.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A slide hammer tool comprising:
- a shaft having opposing first and second ends;
- a handle slidably disposed on the shaft between the first and second ends; and
- a slide hammer weight assembly slidably disposed on the shaft between the first and second ends and removably coupled to the handle.

2. The slide hammer tool of claim 1, wherein the first end is adapted to couple to an attachment.

3. The slide hammer tool of claim 1, wherein the second end includes a stop adapted to receive an impact force from the hammer weight assembly.

4. The slide hammer tool of claim 1, wherein the second end includes a grip.

5. The slide hammer tool of claim 1, wherein the slide hammer weight assembly includes slide hammer weights releasably coupled together.

6. The slide hammer tool of claim 1, wherein the slide hammer weight assembly includes first, second, and third slide hammer weights.

7. The slide hammer tool of claim 6, wherein the first slide hammer weight is removably coupled to the handle with a first set of threaded fasteners, the first and second slide hammer weights are removably coupled together by a second set of threaded fasteners, and the second and third slide hammer weights are removably coupled together by a third set of threaded fasteners.

8. The slide hammer tool of claim 7, wherein each of the first, second, and third slide hammer weight clearance apertures is a counterbore.

9. The slide hammer tool of claim 7, wherein each of the first, second, and third slide hammer weight center apertures are circular.

10. The slide hammer tool of claim 7, wherein the first slide hammer weight includes a first slide hammer weight center aperture adapted to slidably receive the shaft, first slide hammer weight threaded apertures, and first slide hammer weight fastener clearance apertures adapted to respectively receive the first set of threaded fasteners, and the second set of thread fasteners are adapted to respectively threadably engage the first slide hammer weight threaded apertures,
- wherein the second slide hammer weight includes a second slide hammer weight center aperture adapted to slidably receive the shaft, second slide hammer weight threaded apertures, and second slide hammer weight fastener clearance apertures adapted to respectively receive the second set of threaded fasteners, and the third set of thread fasteners are adapted to respectively threadably engage the second slide hammer weight threaded apertures, and wherein the third slide hammer weight includes a third slide hammer weight center aperture adapted to slidably receive the shaft, third slide hammer weight threaded apertures, and third slide hammer weight fastener clearance apertures adapted to respectively receive the third set of threaded fasteners.

11. A slide hammer weight assembly adapted to removably couple to a handle of a slide hammer tool having a shaft with opposing first and second ends, wherein the handle is slidably disposed on the shaft between the first and second ends, the slide hammer weight assembly comprising:

slide hammer weights removably coupled together with threaded fasteners, and adapted to be slidably disposed on the shaft between the first and second ends and removably coupled to the handle.

12. The slide weight assembly of claim 11, wherein the slide hammer weights include first, second, and third slide hammer weights, and wherein the threaded fasteners include first, second, and third sets of threaded fasteners.

13. The slide weight assembly of claim 12, wherein the first slide hammer weight is releasably coupled to the handle via the first set of threaded fasteners, the first and second slide hammer weights are releasable coupled together by the second set of threaded fasteners, and the second and third slide hammer weights are releasably coupled together by the third set of threaded fasteners.

14. The slide weight assembly of claim 13, wherein the first slide hammer weight includes a first slide hammer weight center aperture adapted to slidably receive the shaft of the slide hammer, first slide hammer weight threaded apertures, and first slide hammer weight fastener clearance apertures adapted to respectively receive the first set of threaded fasteners, and the second set of thread fasteners are adapted to respectively threadably engage the first slide hammer weight threaded apertures, wherein the second slide hammer weight includes a second slide hammer weight center aperture adapted to slidably receive the shaft, second slide hammer weight threaded apertures, and second slide hammer weight fastener clearance apertures adapted to respectively receive the second set of threaded fasteners, and the third set of thread fasteners are adapted to respectively threadably engage the second slide hammer weight threaded apertures, and wherein the third slide hammer weight includes a third slide hammer weight center aperture adapted to slidably receive the shaft, third slide hammer weight threaded apertures, and third slide hammer weight fastener clearance apertures adapted to respectively receive the third set of threaded fasteners.

15. The slide weight assembly of claim 14, wherein each of the first, second, and third slide hammer weight clearance apertures is a counterbore.

16. The slide weight assembly of claim 14, wherein each of the first, second, and third slide hammer weight center apertures are circular.

* * * * *